GEORGE TERRY, OF PROVIDENCE, RHODE ISLAND.

Letters Patent No. 88,590, dated April 6, 1869.

IMPROVED METHOD OF MAKING YEAST.

The Schedule referred to in these Letters Patent and making part of the same.

*To all whom it may concern:*

Be it known that I, GEORGE TERRY, of Providence, in the State of Rhode Island, have invented a new and improved Method of Making Yeast; and I do hereby declare that the following is a full and exact description thereof.

The nature of my invention consists in making and using a lactic-acid solution for mixing the materials of which the yeast is made, instead of water.

To enable others skilled in the art to make and use my invention, I will proceed to describe the mode of its manufacture.

To every gallon of water heated to a temperature between 145° and 160°, I add about half a pound of the material to be used, rye-meal for example, and thoroughly stir the mixture, and let it cool down to the temperature of 100°, which temperature is favorable to the lactic-acid fermentation, and I keep the mixture at that temperature, as nearly as convenient, until it has become sufficiently acid, which will take place in twenty-four or forty-eight hours, according to the season of the year.

To stop the lactic-acid fermentation, I cool the mixture down to 70°, below which it will not take place, or I boil the mixture five or ten minutes, which coagulates the albumen of the grain, and thus checks the fermentation, the albumen acting as the ferment.

This solution I use in either of three ways:

I add to it the requisite quantity of the materials to be used, one pound of rye-meal for example, and ferment with yeast in the usual way; or, I pour off the acid solution from the grain, and mix with it the requisite quantity of material and ferment; or, I add to it a little yeast, which ferments any remaining starch there may be in the grain, from which the acid was formed, and then boil it ten or fifteen minutes, and when cooled down and settled, I pour off the solution, and mix with it the requisite quantity of material, and ferment it.

I do not claim a lactic-acid solution; neither do I claim lactic-acid yeast, or yeast containing lactic acid.

What I claim as my invention, and desire to secure by Letters Patent, is—

The method of mixing yeast by using a lactic-acid solution, either wholly or in part, as the menstruum in which the other ingredients are mixed, and fermented, substantially as described.

GEORGE TERRY.

Witnesses:
WILLIAM D. WELLMAN,
ALFRED A. BICKNELL.